United States Patent [19]

Omori et al.

[11] 4,091,420
[45] May 23, 1978

[54] VIDEO AMPLIFIER

[75] Inventors: Yasuo Omori; Hiroshi Kataoka, both of Yokohama, Japan

[73] Assignee: Victor Company of Japan, Limited, Yokohama, Japan

[21] Appl. No.: 757,610

[22] Filed: Jan. 7, 1977

[30] Foreign Application Priority Data

Jan. 9, 1976 Japan .................................. 51/644[U]

[51] Int. Cl.² .............................................. H04N 5/14
[52] U.S. Cl. .................................... 358/184; 358/166; 358/167; 330/302
[58] Field of Search ................. 358/37, 166, 167, 184, 358/904; 330/21, 29

[56] References Cited

U.S. PATENT DOCUMENTS 3,288,930  11/1966  Johnson .......................... 358/167 X
3,472,954  10/1969  Willis ................................. 358/166

Primary Examiner—Robert L. Richardson
Attorney, Agent, or Firm—Lowe, King, Price & Markva

[57] ABSTRACT

A high frequency component detector and a limiter or clipper are provided in a video amplifier, detecting a high frequency component in an incoming video signal, responsive to the detection and clipping only the high frequency component in excess of a predetermined voltage.

8 Claims, 9 Drawing Figures

VIDEO AMPLIFIER

FIELD OF THE INVENTION

The present invention relates generally to a video amplifier for use in a television receiver, and more particularly to a video amplifier wherein overshoot attached to a video signal is clipped when exceeding a predetermined voltage level, thereby to reproduce an image by free from blooming.

BACKGROUND OF THE INVENTION

As is well known in the art, it is very important to pay a particularly attention to the contrast of a reproduced image so as to make the image clear or sharp. More specifically, to increase the contrast of the reproduced image, it is necessary to drive a picture tube by a video signal with a sufficiently large voltage. The maximum voltage, however, should be less than a threshold voltage at which undesirable blooming takes place.

In the following, there will be discussed an inherent defect of prior art in connection with FIGS. 1–3. In FIG. 2(A), reference character $a$ denotes a waveform of a video signal indicating a white level. As is previously referred to, the white level should be less than a threshold value $E_1$ at which the blooming takes place. In the prior art, in order to increase the sharpness of a reproduced image, the video amplifier is designed so as to have a frequency characteristic as shown in FIG. 1, so that the resulting video signal has an overshoot as best shown in FIG. 2(B). However, in FIG. 2(B), when the video signal is reduced to a 100% white level, the overshoot exceeds the threshold voltage $E_1$, the resulting in the reproduced image being deteriorated by the blooming. To avoid this defect, the peak of the overshoot is conventionally set in such a manner as to be less than the threshold voltage $E_1$. However, this decreases undesirably the contrast of the reproduced image.

It has been experimentally confirmed that the appropriate magnitude of the overshoot is about 30% of the video signal. However, the magnitude of the overshoot should be carefully determined in order not to adversely affect the contrast of the reproduced image. This has been hitherto a problem in the circuit design of a video amplifier. Furthermore, in the prior art, a TV viewer cannot easily adjust a reproduced image to a desirable extent due to the blooming.

In order to remove the above mentioned drawback inherent in the prior art, a method has been proposed that the video signal is clamped at the threshold voltage $E_1$. This proposal, however, is accompanied by some shortcomings. That is, although any trouble is not invited when the low frequency component of the video signal (corresponding to the signal in FIG. 2(A)) does not exceed $E_1$ as shown in FIG. 3(A), the video signal will be sliced, or distorted as shown in FIG. 3(B) when the degree of modulation of the transmitted video signal is varied at random by an error which may be present in the transmitter.

SUMMARY OF THE INVENTION

It is therefore a primary object of the present invention to provide an improved video amplifier which permit elimination of the above described defect inherent in the prior art.

Another object of the present invention is to provide an improved video amplifier which clamps the video signal at a predetermined voltage at which blooming may occur.

BRIEF DESCRIPTION OF THE DRAWINGS

These and other objects, features and many of the attendant advantages of this invention will be appreciated more readily as the invention becomes better understood by the following detailed description, wherein like parts in each of the several figures are identified by the same reference characters, and wherein.

Figure 1:
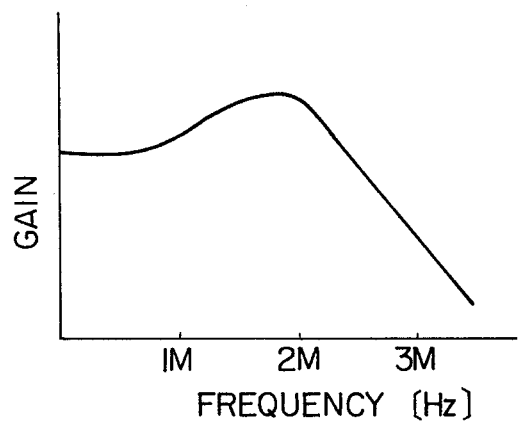
FIG. 1 is a curve showing a frequency characteristic of a video amplifier used in both prior art and the present invention.
Figure 2:
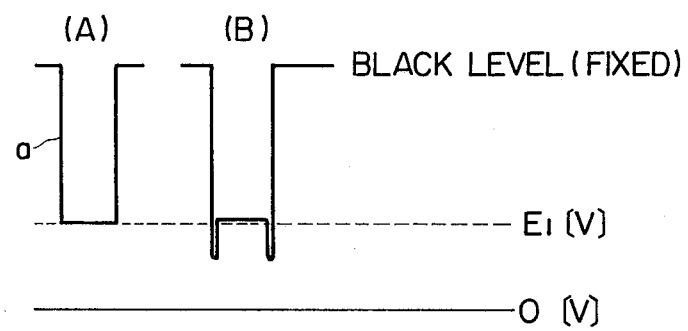
FIGS. 2–3 show waveforms of a video signal for illustrating a manner of clipping according to prior art.
Figure 3:
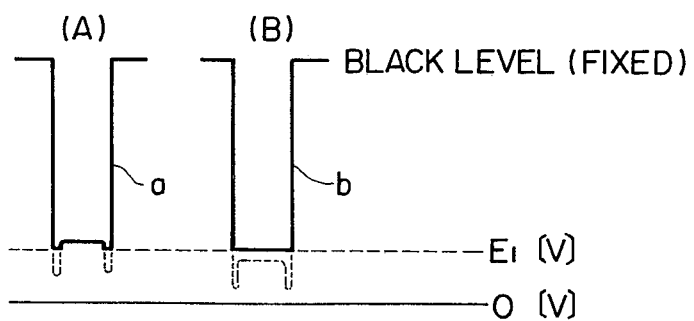

Reference is now made to FIGS. 4, 5, and 7–9. The principle of a first preferred embodiment of the present invention will be first discussed in connection with FIG. 4. A video signal is fed to a video amplifier 2 through an input terminal 1. The video amplifier 2 amplifies the incoming video signal to a predetermined level, feeding the amplifier signal to three circuits: a video amplifier 6, a level detector 3, and a high frequency component detector 4. The video amplifier 6 is interposed between the amplifier 2 and an output terminal 7 for brevity, the amplification factor of the amplifier 2 is assumed to be unity in order to function as a buffer amplifier. The level detector 3 generates an output indicative of a logic "1" only when the amplified signal supplied thereto is in exces of a predetermined level $E_1$ at which blooming may occur. The output of the level detector 3 is fed to a limiter or a clamp circuit 5 as a first gate signal. On the other hand, the high frequency component detector 4 detects high frequency components of the video signal, for example, above 1.5 MHz which are generated by the overshooting of video signal, and passes a logical "1" to one input of the clamping circuit 5 as a second gate signal.

Figure 7:
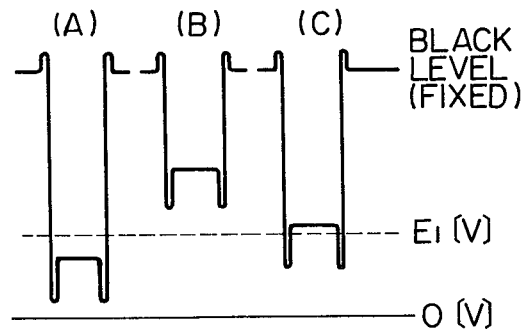
FIGS. 7–9 show various waveforms for illustrating the preferred embodiments of the present invention.
Figure 8:
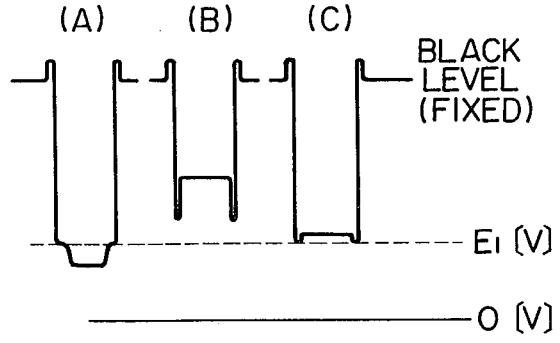
Figure 9:
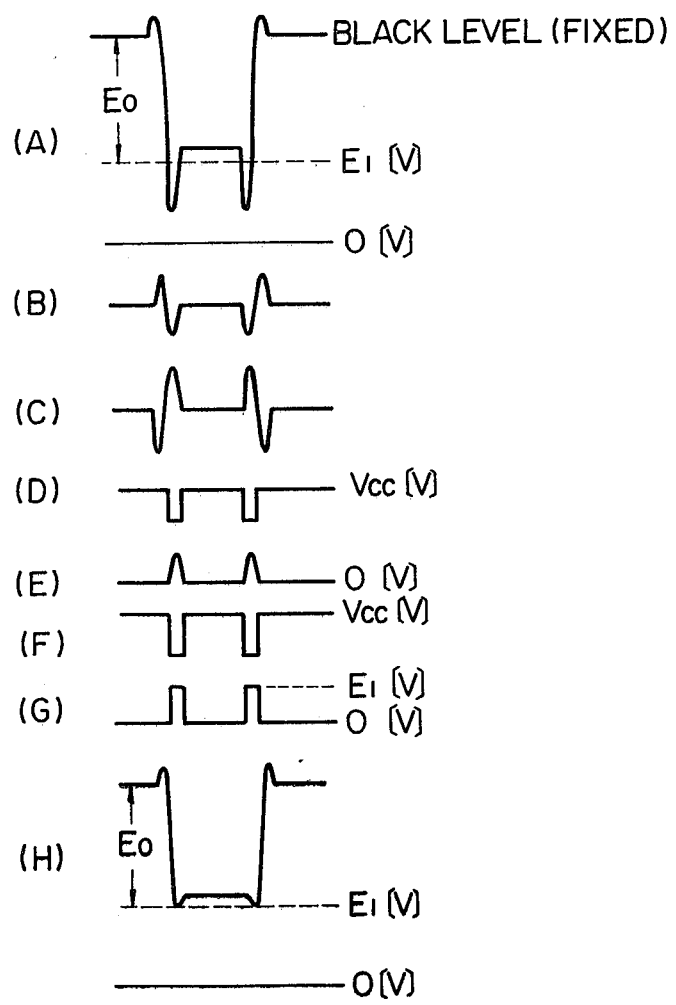

The limiter 5 operates only when "1"s are supplied at the same time from both detectors and cuts off the high frequency components of the video signal that exceed the predetermined level $E_1$. The above discussion is best understood by reference to FIGS. 7 and 8. The high frequency components of of the incoming video signals the waveforms of which are shown in FIGS. 7(A) and 7(C) are clamped at the reference voltage $E_1$ as shown in FIGS. 8(A) and 8(C), while the high frequency components of the incoming video signal the waveform of which are shown in FIG. 7(B) are not clipped at all. In summary, the video signal is clamped at the predetermined voltage $E_1$ when the high frequency components above 1.5 MHz are detected simultaneously with the detection of the video signal exceeding the predetermined voltage level.

Figure 4:
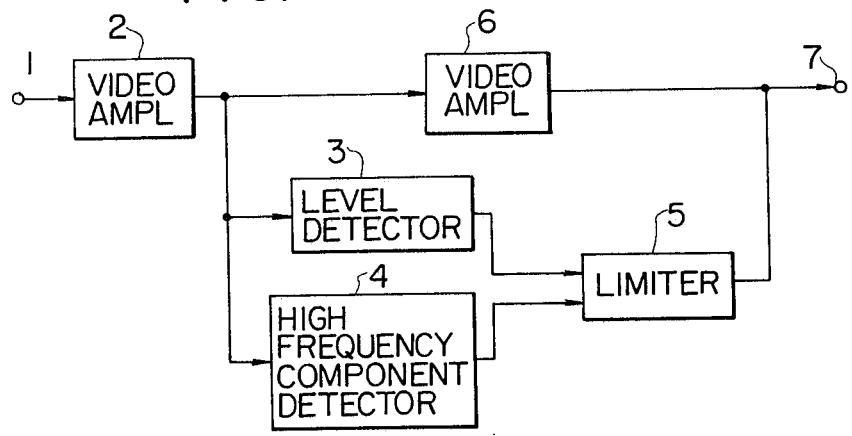
FIG. 4 is a block diagram showing a principle of a first preferred embodiment of the present invention.
Figure 5:
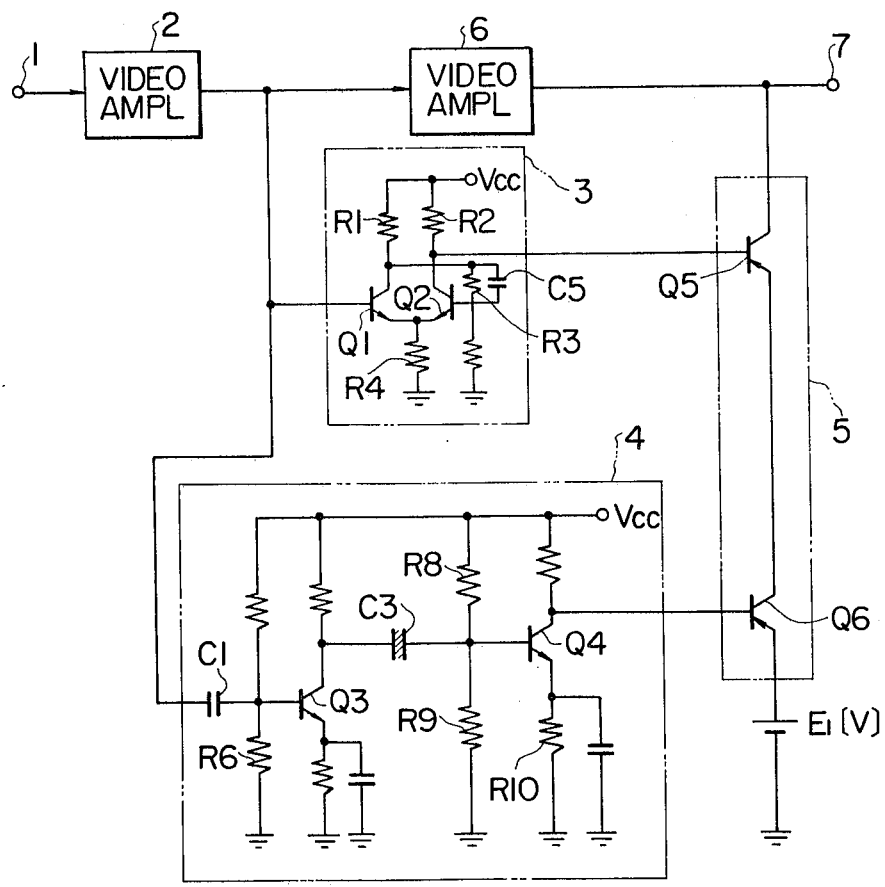
FIG. 5 is detailed circuits of some blocks of FIG. 4.

Referring to FIG. 5, which shows detailed circuits of the detectors 3 and 4 and the limiter 5 in FIG. 4. The amplified video signal, the waveform of which is shown in FIG. 9(A), is applied to a high pass filter, consisting of a capacitor C1 and a resistor R6, of the detector 4. The output of the high pass filter shown in FIG. 9(B) is applied to the base of a transistor Q3 to be amplified thereat. The waveform of the amplified signal at the collector of the transistor Q3 is shown in FIG. 9(C). The output of the transistor Q3 is then fed to the base of a transistor Q4 through a capacitor C3. Resistors R8, R9, and R10 are chosen in such a manner as to render the transistor Q4 conductive only when the output of the transistor Q3 is positive. Therefore, the outputs appearing at the collector and the emitter of the transistor Q4 have respectively waveforms as shown in FIGS. 9(D) and 9(E). The output at the collector of the transistor Q4 is then fed to the base of a transistor Q6, rendering the same conductive only when the transistor Q4 is conductive. It is therefore understood that the voltage at the collector of the transistor Q6 rises up to the voltage E1 when rendered conductive.

On the other hand, the amplified video signal from the amplifier 2 is also fed to the level detector 3 which is a Schmitt trigger and comprises resistors R1, R2, R3, and R4, capacitor C5, and two transistors Q1 and Q2. When the voltage of the applied signal is in excess of E1, the transistors Q1 and Q2 are respectively rendered non-conductive and conductive. The output at the collector of the transistor Q2 has therefore a waveform as shown in FIG. 9(F). The conductive condition of the transistor Q2 renders in turn a transistor Q5 conductive. The limiter 5, which consists of the transistors Q5 and Q6, is rendered conductive only when the transistors Q5 and Q6 in a series circuit are simultaneously rendered conductive. This occurs only when the video signal from the amplifier 2 contains high frequency components above a predetermined frequency and at the same time the level of the signal is above the voltage E1. Under such conditions, the video signal at the output terminal 7 is clipped at the voltage E1. It is therefore understood from the above that even if the magnitude of the video signal from the amplifier 2 does not exceed voltage E1, the video signal is not clipped if the video signal does not contain such high frequency components. Similarly, the video signal is not clamped at all when the magnitude of the video signal from the amplifier 2 exceeds the threshold level the voltage E1 even if the high frequency components of the video signal are detected.

Figure 6:
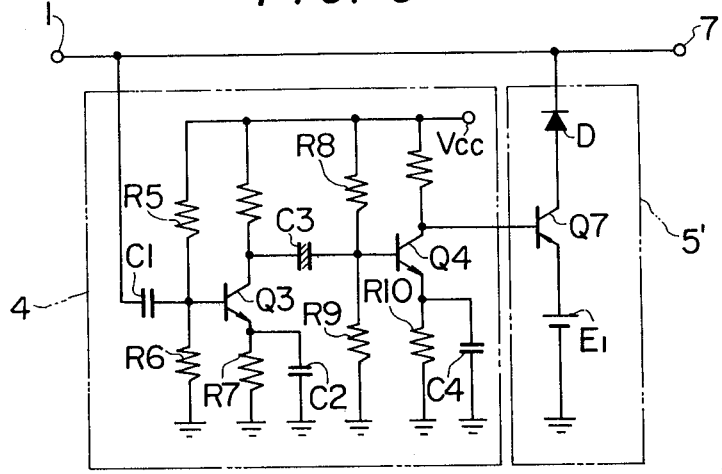
FIG. 6 is a detailed circuit showing a second preferred embodiment of the present invention.

Reference is now made to FIG. 6, which shows a second preferred embodiment of the present invention. The difference between the first and the second embodiments is that the latter does not include the level detector 3 and is provided with a diode D in substitution for the transistor Q5. As previously referred to in connection with FIG. 5, the transistor Q6 is rendered conductive only when the video signal contains the high frequency components. On the other hand, the diode D is rendered conductive only when the video signal is above the voltage E1, so that the video signal is clamped at the threshold level E1.

The present invention has been described in connection with certain preferred embodiment however, it is appreciated that various changes may be made in the various components and circuits without departing from the intended spirit and scope of the present invention as defined by the appended claims.

What is claimed is:

1. A video amplifier for use in a television receiver, comprising in combination:
    a channel including an input terminal to which a video signal is applied and an output terminal from which the video signal is delivered;
    a frequency detector connected to the input terminal for detecting high frequency components of said video signal to provide a first output signal;
    an amplitude detector connected to the input terminal for detecting when said video signal is in excess of a predetermined voltage level to provide a second output signal; and
    a clamping circuit responsive to a simultaneous occurrence of said first and second output signals for clamping the amplitude of said video signal at said output terminal to said predetermined voltage level.

2. A video amplifier a claimed in claim 1, wherein said clamping circuit comprises a source of voltage and a pair of first and second gate-controlled switching devices connected in series between said voltage source and said output terminal and responsive to said first and second output signals, respectively, to couple said voltage source to said output terminal.

3. A video amplifier as claimed in claim 2, wherein said frequency detector comprises a high pass filter for allowing the high frequency components of the video signal to pass therethrough and means connected to the high pass filter for generating a pulse in response to the high frequency components passing through said high pass filter, and wherein said first gate-controlled switching device is responsive to said pulse.

4. A video amplifier as claimed in claim 3, wherein said pulse generating means includes an amplifier.

5. A video amplifier as claimed in claim 1, wherein said clamping circuit comprises a source of voltage and a gate-controlled switching device responsive to said first output signal, and wherein said amplitude detector comprises a diode connected in series with said switching device between said voltage source and said output terminal and poled such that said voltage is coupled to said output terminal when said video signal falls below the magnitude of said voltage source.

6. A video amplifier as claimed in claim 5, wherein said frequency detector comprises a high pass filter for allowing the high frequency components of the video signal to pass therethrough and means connected to the high pass filter for generating a pulse in response to the high frequency components passing through said high pass filter, and wherein said gate-controlled switching device is responsive to said generated pulse.

7. A video amplifier as claimed in claim 6, wherein said pulse generating means includes an amplifier.

8. A video amplifier as claimed in claim 1, wherein the amplitude detector is a Schmitt trigger.

* * * * *